United States Patent
Imaoka

(10) Patent No.: US 7,043,152 B2
(45) Date of Patent: May 9, 2006

(54) EYE IMAGE PICKUP DEVICE

(75) Inventor: Takuya Imaoka, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 157 days.

(21) Appl. No.: 10/492,312

(22) PCT Filed: May 30, 2003

(86) PCT No.: PCT/JP03/06882

§ 371 (c)(1),
(2), (4) Date: Apr. 12, 2004

(87) PCT Pub. No.: WO03/101296

PCT Pub. Date: Dec. 11, 2003

(65) Prior Publication Data

US 2004/0252988 A1    Dec. 16, 2004

(30) Foreign Application Priority Data

May 30, 2002 (JP) .............................. 2002-157869

(51) Int. Cl.
*A61B 1/04* (2006.01)
*G03B 29/00* (2006.01)
*G03B 13/02* (2006.01)
*H04N 7/18* (2006.01)
*H04N 9/47* (2006.01)

(52) U.S. Cl. ........................... 396/18; 396/376; 348/78

(58) Field of Classification Search .................. 396/18, 396/376, 661; 348/78; 382/117

See application file for complete search history.

(56) References Cited

U.S. PATENT DOCUMENTS 4,560,261 A * 12/1985 Ueda et al. .................. 396/336
5,751,836 A * 5/1998 Wildes et al. ............... 382/117

FOREIGN PATENT DOCUMENTS

| JP | 2000-5146 | | 1/2000 |
| JP | 2001-17410 | A | 1/2001 |
| JP | 2001-297322 | A | 10/2001 |
| JP | 2002-92605 | A | 3/2002 |

* cited by examiner

*Primary Examiner*—W. B. Perkey
*Assistant Examiner*—Rishi Suthar
(74) *Attorney, Agent, or Firm*—Pearne & Gordon LLP

(57) ABSTRACT

An object of the invention is to precisely guide the position of an eye in order to acquire an excellent eye image which is suitable for an authentication.

The invention provides an eye image pick-up apparatus including an image pick-up unit for picking up an image of an object, a mirror (40) provided on a front face of the image pick-up unit perpendicularly to an optical axis of the image pick-up unit and serving to reflect a reflected image of the object, an opening section (42) provided in a portion of the mirror (40) which intersects the optical axis and serving to align a position of an eye in the reflected image of the object reflected in the mirror (40), visible light source sections (46) and (47) provided on both left and right ends at a back side of the mirror (40), and shielding plates (43) and (44) provided on both left and right ends at a front side of the mirror (40) and serving to shield a light emitted from the left and right corresponding visible light source sections (46) and (47). A person to be authenticated can easily decide whether his (her) own left or right eye is held in a photographing position depending on whether the visible light source sections (46) and (47) on back faces can be seen from the left and right shielding plates (43) and (44).

16 Claims, 8 Drawing Sheets

FIG. 4A  FIG. 4B  FIG. 4C

CASE OF OPPOSITE EYE GUIDE

CASE OF RIGHT EYE GUIDE

CASE OF LEFT EYE GUIDE

LEFT EYE     RIGHT EYE

PICKED-UP IMAGE

EYE IMAGE PICKUP DEVICE

TECHNICAL FIELD

The present invention relates to an eye image pick-up apparatus which acquires an image of an iris in order to carry out personal authentication, and more particularly to an eye image pick-up apparatus which enables to guide the position of the eye of a person to be authenticated within a photographing range with high precision.

BACKGROUND ART

Social needs for personal authentication have been increased so that an authenticating apparatus using information about a personal organism has spread. The information about the personal organism to be used is generally a fingerprint and attention has also been paid to an iris pattern and a retina pattern. In the case that the iris pattern or the retina pattern is used for the personal authentication, there is an advantage that the iris pattern is preferably photographed in non-contact differently from the fingerprint.

However, if an excellent iris pattern cannot be photographed rapidly and precisely, a time taken for causing an authenticated person to wait is increased. As a result, the authenticated person feels uncomfortable. Therefore, it is necessary to guide the eye of the authenticated person into the front position of a camera for photographing the iris pattern, thereby photographing an excellent image of the eye.

FIG. 16 is a view showing the appearance of a conventional eye image pick-up apparatus described in JP-A-2000-5146, for example. A cold mirror 2 and an infrared illuminating section 3 are provided on the front face of a housing of an eye image pick-up apparatus 1, and a camera is built in the back side of the cold mirror 2. A marking mark 4 which indicates the position of a lens of the camera is provided on the center of the cold mirror 2. When a person to be authenticated stands in the front position of the eye image pick-up apparatus 1 to reflect his (her) own eye in the cold mirror 2, the camera acquires the image of the eye of the authenticated person.

However, in the conventional eye image pick-up apparatus, when the authenticated person judges that he (she) is in a correct photographing position in a state that the image of a right eye reflected in the cold mirror 2 is seen with a left eye or the image of the left eye reflected in the cold mirror 2 is seen with the right eye as shown in FIG. 17A, there is also a problem that the position of the middle of a forehead is placed on the center of a photographing screen 5 so that the right eye cannot be aligned with the center of the photographing screen 5 or the left eye cannot be aligned with the center of the photographing screen 5.

The invention has been made to solve the problems of the related art and has an object to provide an eye image pick-up apparatus which easily enables to guide the position of the eye of the authenticated person to a correct photographing position.

DISCLOSURE OF INVENTION

The invention provides an eye image pick-up apparatus having: an image pick-up unit for picking up an image of an object; a mirror, which is provided on a front face of the image pick-up unit in a direction perpendicular to an optical axis of the image pick-up unit, for reflecting a reflected image of the object; an opening section, which is provided in a portion of the mirror which intersects the optical axis, to be aligned with a position of an eye in the reflected image of the object reflected in the mirror; a visible light source section provided on both left and right ends at a back side of the mirror; and a shielding plate, which is provided on both left and right ends at a front side of the mirror, for shielding a light emitted from the visible light source section corresponding to left and right.

According to the configuration, a person to be authenticated can easily recognize whether his (her) left or right eye is placed in a photographing position or whether the image of the right eye (or the left eye) is seen with the left eye (or the right eye) depending on whether the visible light source sections provided on the back faces of the left and right shielding plates are seen from the same shielding plates. Thus, it is possible to smoothly align a photographing position.

The invention provides an eye image pick-up apparatus having: an image pick-up unit for picking up an image of an object; a mirror, which is provided on a front face of the image pick-up unit in a direction perpendicular to an optical axis of the image pick-up unit, for reflecting a reflected image of the object; an opening section, which is provided in a portion of the mirror which intersects the optical axis, to be aligned with a position of an eye in the reflected image of the object reflected in the mirror; and a mark, which is provided on both left and right ends at a front side of the mirror, for having different colors on a surface in a direction of the object and on a back face thereof.

According to the configuration, similarly, the authenticated person can easily recognize whether his (her) left or right eye is present within a photographing range or whether the image of the right eye (or the left eye) is seen with the left eye (or the right eye). Thus, it is possible to smoothly align a photographing position.

The invention provides the eye image pick-up apparatus, wherein the mirror is a half mirror in which the opening section is not provided. According to the configuration, the configuration of the mirror can be simplified so that a manufacturing cost can be reduced.

The invention provides the eye image pick-up apparatus, wherein the mirror is configured by a material which absorbs a visible light. According to the configuration, it is not necessary to separately insert a visible light cut filter. Consequently, the configuration of the apparatus can be simplified so that the manufacturing cost can be reduced.

The invention provides the eye image pick-up apparatus, wherein a mirror which has a width of d/2 and a length of h/2 is utilized as the mirror when an image pick-up unit whose photographing range in a position apart from the object is d in width and h in length is used. According to the configuration, the authenticated person can easily recognize whether his (her) eye is present within the photographing range of the image pick-up unit.

The invention provides the eye image pick-up apparatus, wherein a frame having a width of d/2 and a length of h/2 is provided to the mirror when an image pick-up unit whose photographing range in a position apart from the object is d in width and h in length is used. According to the configuration, similarly, the authenticated person can easily recognize whether his (or her) eye is present within the photographing range of the image pick-up unit.

The invention provides the eye image pick-up apparatus, wherein the mirror has such a lateral length that both eyes of the object are picked up. According to the configuration, the authenticated person can pick up an image without the eye inclined.

The invention provides the eye image pick-up apparatus, wherein the mirror has a visible light absorbing characteristic. According to the configuration, an eye image can be picked up as an infrared image and it is possible to obtain a clear eye image which is suitable for an authentication.

The invention provides the eye image pick-up apparatus, further having a section for rotating the mirror around a horizontal axis by the mirror and the image pick-up unit in a body. According to the configuration, it is possible to provide an eye image pick-up apparatus which can be adjusted corresponding to the height of the authenticated person and is very easy to use.

BRIEF DESCRIPTION OF DRAWINGS

FIGS. 4A–4C are explanatory views showing eye position guide using the guide mirror according to the first embodiment of the invention;

Figure 1:
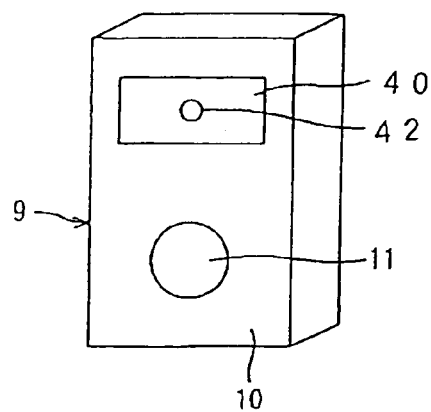
FIG. 1 is a view showing the appearance of an eye image pick-up apparatus according to a first embodiment of the invention.

In the drawings, 9, 17, 25 and 85 denote an eye image pick-up apparatus, 16, 21, 29, 30, 55 and 80 denote an image pick-up device, 11, 19, 27 and 87 denote an infrared illuminating section, 12, 20, 40, 60, 70, 81 and 89 denote an guide mirror, 13, 42, 62, 82 and 91 denote an opening section, 14, 83 and 88 denote an optical axis, 15 denotes an eye of a person to be authenticated, 22 denotes a display visible light source section, 23 denotes a reflected image of the eye, 28 denotes a visible light cut filter (a visible light absorption filter), 41 and 61 denote a transparent plate, 43 and 44 denote a shielding plate, 46 and 47 denote a light emitting film, and 64 and 65 denote an opposite eye guide preventing mark.

BEST MODE FOR CARRYING OUT THE INVENTION

Embodiments of the invention will be described below with reference to the drawings.

FIG. 1 is a view showing the appearance of an eye image pick-up apparatus according to a first embodiment of the invention. An eye image pick-up apparatus 9 according to the embodiment has a rectangular housing 10, an infrared illuminating section 11 attached to the front face of the housing 10, a rectangular guide mirror 40 attached to the front face of the housing 10 which will be described below in detail, an opening section 42 provided on the center of the guide mirror 40, and a built-in camera (an image pick-up unit) 30 (see FIG. 2) attached to the back side of the guide mirror 40 and serving to pick up, through the opening section 42, the eye image of an authenticated person who stands in front of the housing 10.

Figure 2:
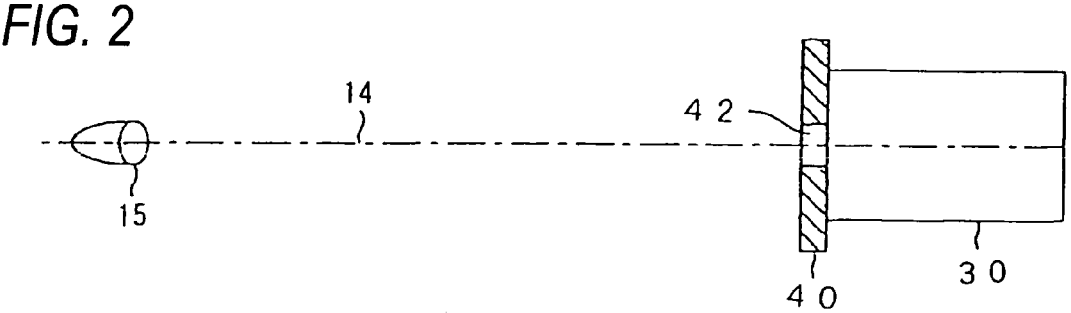
FIG. 2 is an explanatory view showing the principle of the image pick-up of the eye image pick-up apparatus according to the first embodiment of the invention.

FIG. 2 is an explanatory view showing the principle of the image pick-up of the eye image pick-up apparatus according to the embodiment. The guide mirror 40 is provided in a direction perpendicular to an optical axis 14 of the image pick-up unit 30 and is arranged in such a manner that the opening section 42 provided on the center of the guide mirror 40 intersects the optical axis 14. Therefore, when the authenticated person moves to a position where his (her) eye 15 is reflected on the opening section 42 of the guide mirror 40, the eye 15 can be guided into the photographing range of the eye image pick-up apparatus 9. As a result, an eye image can reliably be photographed.

Figure 3:
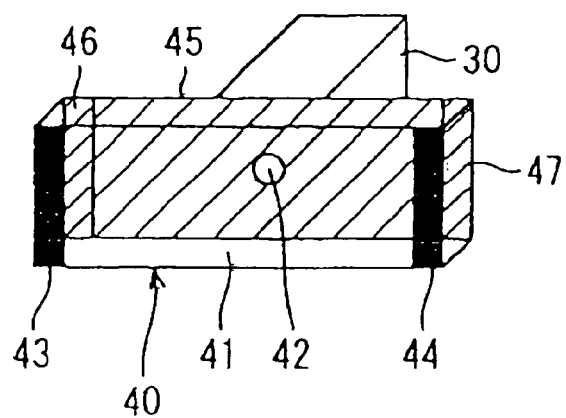
FIG. 3 is a view showing the structure of an guide mirror to be used in the eye image pick-up apparatus according to the first embodiment of the invention.

FIG. 3 is a view showing the detailed structure of the guide mirror 40. The guide mirror 40 attached to the front face of the image pick-up unit 30 is provided in a direction perpendicular to the optical axis of the image pick-up unit 30. The guide mirror 40 according to the embodiment, which serves to guide the eye of the authenticated person, has a rectangular transparent plate 41, an opening 42 provided on the center of the transparent plate 41, shielding plates 43 and 44 provided on right and left sides of the front side of the transparent plate 41, a reflecting film 45 coated over a portion of the back face of the transparent 41 other than both sides, and light emitting films 46 and 47 coated over a portion on both sides of the back side of the transparent plate 41 in which the reflecting film 45 is not provided. The guide mirror 40 is arranged in such a manner that the optical axis of the image pick-up unit 30 passes through the center of the opening 42.

Each of the light emitting films 46 and 47 is formed by a fluorescent coating film, for example, and emits a visible light upon receipt of a light emitted from an electric bulb or a light emitting unit (not shown) which is provided on a rear portion thereof. It is also possible to employ a structure in which the light of the light emitting unit is incident on the transparent plate 41 from both sides on the back side of the transparent plate 41 without the light emitting films 46 and 47.

FIGS. 4A–4C are explanatory views showing a method of guiding the authenticated person standing in front of the guide mirror 40 according to the embodiment. As shown in FIG. 4A, for example, when the authenticated person sees the image of his (her) left eye (or right eye) reflected in the guide mirror 40 with the right eye (or left eye) (the state described in FIG. 15), an image 50 picked up by the image pick-up unit 30 takes the centerline of a face as a center and the image of the eye cannot be obtained.

By using the guide mirror 40 according to the embodiment, however, the authenticated person can easily recognize this state. More specifically, in a state that the image of the left eye (or right eye) reflected in the guide mirror 40 is seen with the right eye (or left eye), both of the light emitting films 46 and 47 hidden behind the shielding plates 43 and 44 can be seen (the state in FIG. 4A). When the authenticated person moves to a position where a state in FIG. 4B or FIG. 4C to be described below is brought, consequently, an excellent eye image can be picked up.

FIG. 4B is a view showing the state in which the authenticated person sees the image of his (her) right eye reflected in the guide mirror 40 with the right eye. In this state, although the authenticated person cannot see the light emitting film 46 on the left side with the left and right eyes, he (she) can see the light emitting film 47 on the right side with the left eye. Consequently, the authenticated person can recognize that he (she) is in a position where the image of the right eye is picked up. The image of the right eye is taken in an image 51 picked up at that time.

FIG. 4C is a view showing the state in which the authenticated person sees the image of his (her) left eye reflected in the guide mirror 40 with the left eye. In this state, although the authenticated person cannot see the light emitting film 47 on the right side with the left and right eyes, he (she) can see the light emitting film 46 on the left side with the right eye. Consequently, the authenticated person can recognize that he (she) is in a position where the image of the left eye is picked up. The image of the left eye is taken in an image 52 picked up at that time.

According to the embodiment, thus, it is possible to know either of the eyes which sees the guide mirror 40 by himself (herself) depending on the state in which the light emitting films 46 and 47 can be seen. Consequently, it is possible to recognize that the image seen with the guide mirror is an opposite eye or not. Consequently, a failure of the guide can be eliminated. While the light emitting films 46 and 47 and the shielding plates 43 and 44 are formed integrally with the guide mirror 40 in the embodiment, the structure of the light emitting films 46 and 47 and the shielding plates 43 and 44 may be provided separately from the guide mirror 40 and the guide mirror 40 may be set to be a thin ordinary mirror.

Figure 5A:
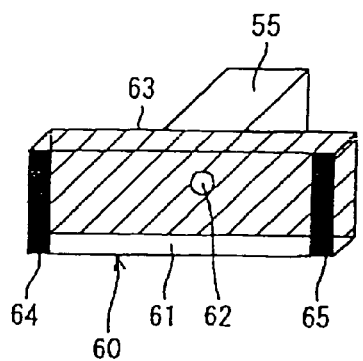
FIGS. 5A and 5B are views showing the structure of an guide mirror to be used in an eye image pick-up apparatus according to a second embodiment of the invention.
Figure 5B:
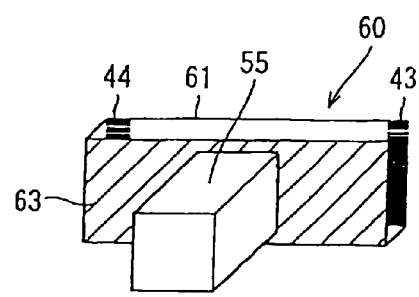

FIGS. 5A and 5B are views showing the structure of an guide mirror according to a second embodiment of the invention. FIG. 5A is a perspective view seen from a front part and FIG. 5B is a perspective view showing a back side. A rectangular guide mirror 60 is provided on the front face of an image pick-up unit 55 in a direction perpendicular to the optical axis of the image pick-up unit 55. The guide mirror 60, which serves to guide the eye of a person to be authenticated, has a transparent plate 61, an opening 62 provided on the center of the transparent plate 61, a reflecting film 63 coated over the whole back face of the transparent plate 61, and opposite eye guide preventing marks 64 and 65 provided along left and right edges on the front face side of the transparent plate 61. The opposite eye guide preventing marks 64 and 65 are formed by a film coated over the transparent film 61 and a surface turned toward an object side and a back face thereof have different colors from each other in the embodiment. The marks 64 and 65 are not restricted to the coating film but may be formed by a plate material to be stuck to the transparent plate 61, for example.

In the case that the guide mirror 60 according to the embodiment is used, the authenticated person can recognize that he (she) stands in an incorrect position because the color on the back side of the opposite eye guide preventing marks 64 and 65 is reflected in the reflecting film 63 in a state that the image of a left eye is seen with a right eye as described with reference to FIG. 4A.

When the image of the right eye reflected in the guide mirror 60 is seen with the right eye, the color on the back side of the opposite eye guide preventing mark 65 at a right side is reflected in the reflecting film 63. To the contrary, when the image of the left eye reflected in the guide mirror 60 is seen with the left eye, the color on the back side of the opposite eye guide preventing mark 64 at a left side is reflected in the reflecting film 63. Consequently, the authenticated person can recognize that he (she) stands in a correct position. While the opposite eye guide preventing marks 64 and 65 are provided integrally with the guide mirror 60 also in the embodiment, it is also possible to provide them separately from the mirror in the same manner as described below.

Figure 6:
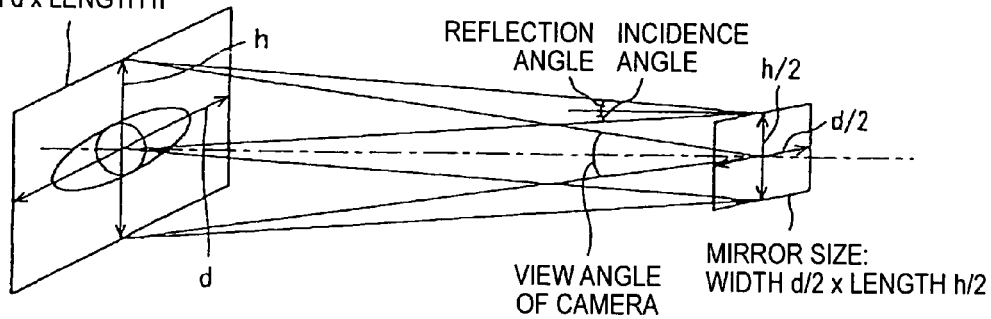
FIG. 6 is a view showing a relationship between a photographing range and an guide mirror in an eye image pick-up apparatus according to a third embodiment of the invention.

FIG. 6 is an explanatory view showing a relationship between the photographing range of an eye image pick-up apparatus and an guide mirror according to a third embodiment of the invention. If the size of an guide mirror to be attached to the front face of the eye image pick-up apparatus has a width of d/2 and a length of h/2 when the photographing range of the eye image pick-up apparatus placed in a position apart from an object has a width of d and a length of h, the range of an image reflected in the guide mirror and that of the eye image pick-up apparatus are equal to each other in geometrically optical theory. In the embodiment, accordingly, the size of the guide mirror to be used has a width of d/2 and a length of h/2. Consequently, the authenticated person can recognize that a range reflected in the guide mirror is to be photographed.

Figure 7:
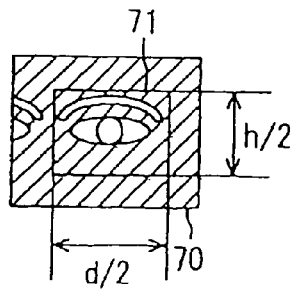
FIG. 7 is a view showing the structure of an guide mirror to be used in an eye image pick-up apparatus according to a fourth embodiment of the invention.

FIG. 7 is a view showing the structure of an guide mirror to be used in an eye image pick-up apparatus according to a fourth embodiment of the invention. In the third embodiment, the size itself of the guide mirror is set to have a width of d/2 and a length of h/2. In an guide mirror 70 according to the embodiment, when the photographing range of the eye image pick-up apparatus placed in a position apart from an object has a width of d and a length of h, a little larger mirror is used for the guide mirror 70 and an guide frame 71 having a width of d/2 and a length of h/2 is further attached to the same mirror.

Consequently, the size of the image of a person to be authenticated which can be held in the guide frame 71 is equal to that of an image within a range photographed by the eye image pick-up apparatus. Therefore, the authenticated person stands in a position where the image of his (her) eye is held in the guide frame 71 so that an excellent eye image can be picked up. Thus, it is possible to guide the authenticated person precisely and easily by clarifying the guide frame 71 indicative of a range to be photographed for the guide mirror 70.

Figure 8:
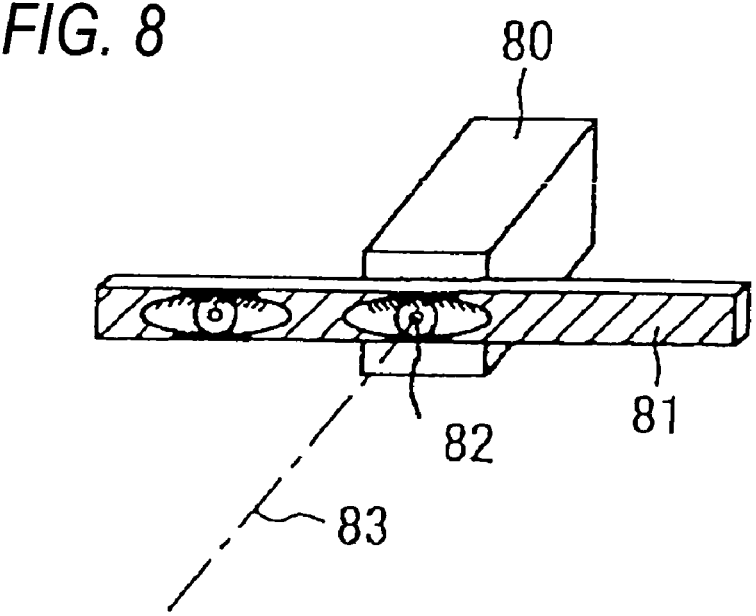
FIG. 8 is a view showing the appearance of an eye image pick-up apparatus according to a fifth embodiment of the invention.

FIG. 8 is a view showing the appearance of an eye image pick-up apparatus according to a fifth embodiment of the invention. A laterally long guide mirror 81 is provided on the front face of an image pick-up unit 80 according to the embodiment. The guide mirror 81 has such a length that both of the images of the left and right eyes of a person to be authenticated are reflected. In this example, furthermore, an opening section 82 is provided in a central position and the image pick-up unit 80 is provided on the back side of the opening section 82. An optical axis 83 of the image pick-up unit 80 passes through the center of the opening section 82 and the guide mirror 81 is provided in a direction perpendicular to the optical axis 83.

According to the embodiment, both eyes are reflected in the guide mirror 81. Therefore, the authenticated person can easily maintain the eyes horizontally with respect to the eye image pick-up unit 80 and an erected eye image, that is, a non-inclined eye image can easily be picked up.

Figure 9:
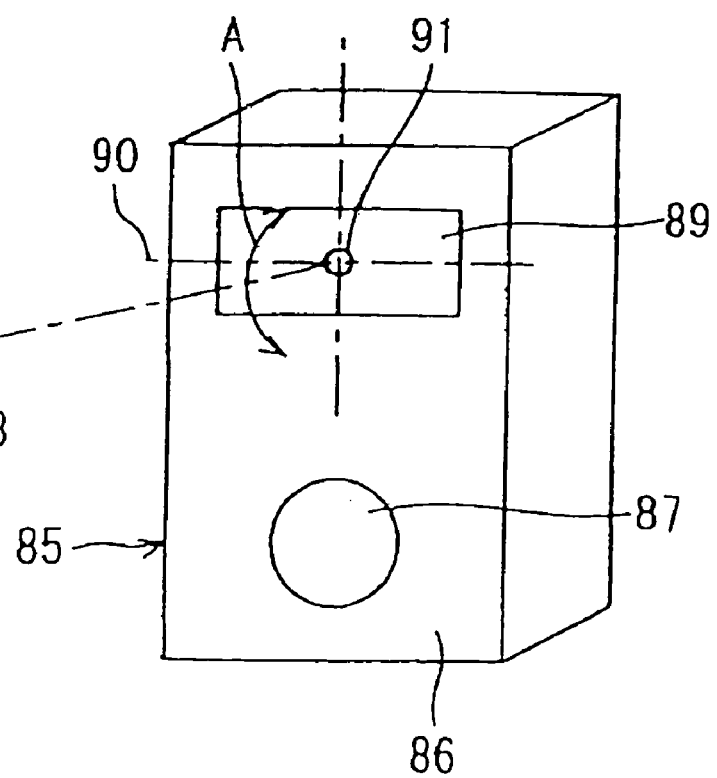
FIG. 9 is a view showing the appearance of an eye image pick-up apparatus according to a sixth embodiment of the invention.

FIG. 9 is a view showing the appearance of an eye image pick-up apparatus according to a sixth embodiment of the invention. An eye image pick-up apparatus 85 according to the embodiment has a rectangular housing 86, an infrared illuminating section 87 provided in the position of the front face of the housing 86, an image pick-up unit (not shown) provided in the housing 86, and a rectangular guide mirror 89 fixed to the position of the front face of the image pick-up unit in a direction perpendicular to an optical axis 88 of the image pick-up unit. The guide mirror 89 is attached to the housing 86 rotatablly around a horizontal axis 90. More specifically, when the guide mirror 89 is rotated, the image pick-up unit is also moved integrally with the guide mirror 89. An opening 91 intersecting the optical axis 88 of the image pick-up unit is provided on the center of the guide mirror 89.

The guide mirror 89 may be the same as the guide mirror according to each of the first to fifth embodiments, and the embodiment features that the guide mirror 89 is attached rotatablly around the horizontal axis 90. According to the configuration, when it is hard for a tall authenticated person to reflect his (her) eye in the guide mirror 89 with a stoop or it is hard for a short authenticated person to reflect his (her) eye in the guide mirror 89 with standing on tiptoe, they rotate the guide mirror 89 by hand in the direction of an arrow A to reflect their eye in the guide mirror 89 in a comfortable posture. Consequently, the optical axis 88 of the image pick-up unit can be turned toward his (her) eye so that an excellent eye image can be picked up.

Figure 10:
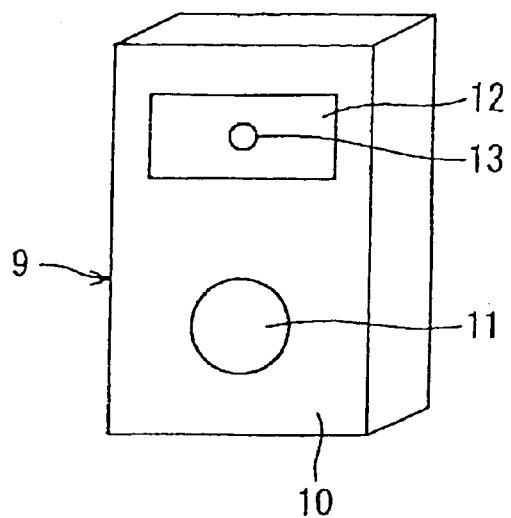
FIG. 10 is a view showing the appearance of an eye image pick-up apparatus according to a seventh embodiment of the invention.

FIG. 10 is a view showing the appearance of an eye image pick-up apparatus according to a seventh embodiment of the invention. An eye image pick-up apparatus 9 according to the embodiment has a rectangular housing 10, an infrared illuminating section 11 attached to the front face of the housing 10, an guide mirror 12 attached to the front face of the housing 10 and formed by a rectangular ordinary mirror, an opening section 13 provided on the center of the guide mirror 12, and a built-in camera (an image pick-up unit) 16 (see FIG. 11) attached to the back side of the guide mirror 12 and serving to pick up the eye image of an authenticated person who stands in front of the housing 10 through the opening section 13.

Figure 11:
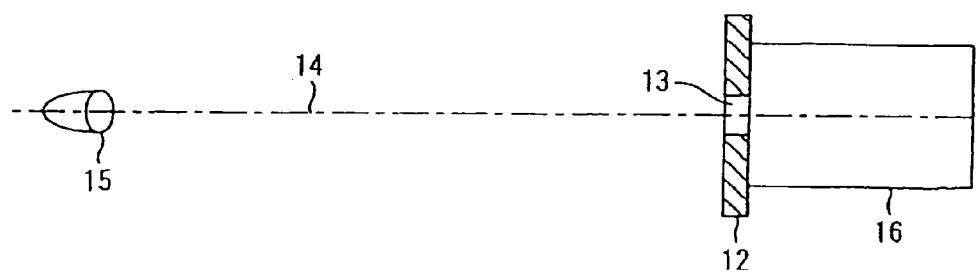
FIG. 11 is an explanatory view showing the principle of the image pick-up of the eye image pick-up apparatus according to the seventh embodiment of the invention.

FIG. 11 is an explanatory view showing the principle of the image pick-up of the eye image pick-up apparatus according to the seventh embodiment. The guide mirror 12 is provided in a direction perpendicular to an optical axis 14 of the image pick-up unit 16 and is arranged in such a manner that the opening section 13 provided on the center of the guide mirror 12 intersects the optical axis 14. When a person to be authenticated moves to a position where his (her) eye 15 is photographed on the opening section 13 of the guide mirror 12, consequently, his (her) eye 15 can be guided into the photographing range of the eye image pick-up apparatus 10 so that an eye image can be photographed reliably. Moreover, the eye image pick-up apparatus according to the embodiment can be manufactured inexpensively.

The opening section 13 is provided on the guide mirror 12 in the eye image pick-up apparatus 9 according to the embodiment. The opening section 13 does not need to be a physical "opening" but has such a structure that a reflecting film, for example, aluminum to be deposited on the back face of the transparent plate of the guide mirror 12 is not deposited in a portion of the opening section 13.

Figure 12:
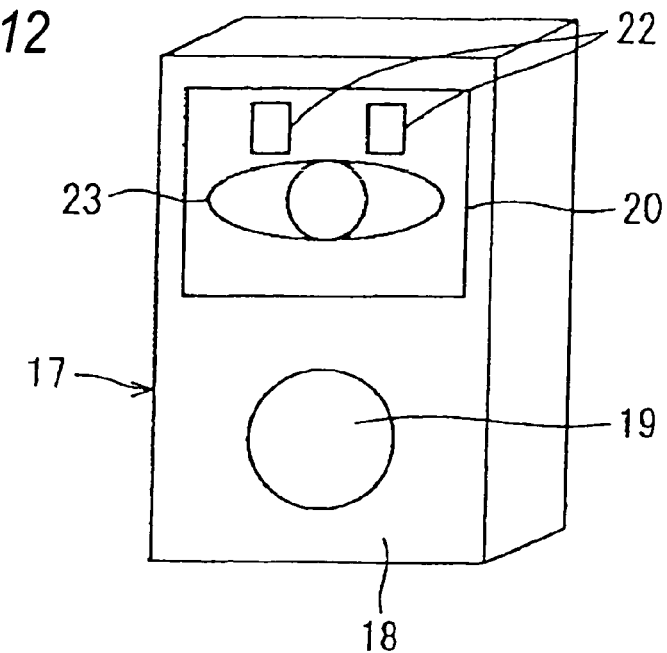
FIG. 12 is a view showing the appearance of an eye image pick-up apparatus according to an eighth embodiment of the invention.

FIG. 12 is a view showing the appearance of an eye image pick-up apparatus according to an eighth embodiment of the invention. An eye image pick-up apparatus 17 according to the embodiment has a rectangular housing 18, an infrared illuminating section 19 attached to the front face of the housing 18, a rectangular guide mirror 20 attached to the front face of the housing 18, an image pick-up unit 21 (see FIG. 13) attached to the back side of the guide mirror 20, and two display visible light source sections 22 attached to the back side or the guide mirror 20.

The guide mirror 20 according to the embodiment is formed by an ordinary half mirror, that is, a mirror for reflecting a part of an incident light and transmitting a residual part. The guide mirror 20 is provided in a direction perpendicular to the optical axis of the image pick-up unit 21. Moreover, the display visible light source section 22 serves to inform an authenticated person of a result of the authentication and informs the authenticated person of a result of focusing of a camera, thereby guiding the authenticated person to the photographing position of the eye image pick-up apparatus 17.

Figure 13:
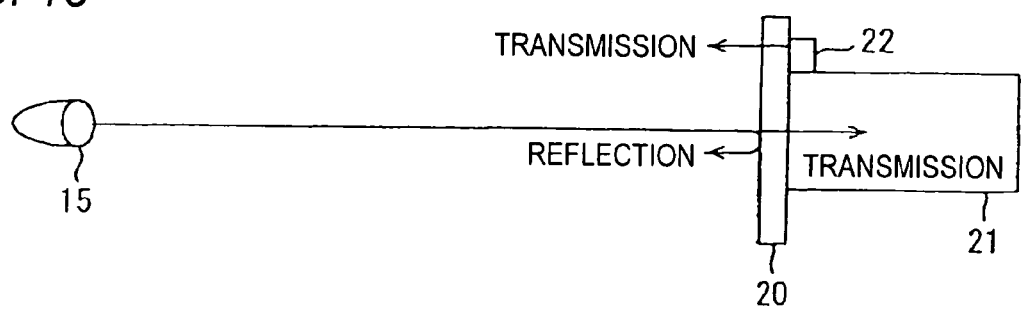
FIG. 13 is an explanatory view showing the principle of the image pick-up of the eye image pick-up apparatus according to the eighth embodiment of the invention.

FIG. 13 is an explanatory view showing the principle of the image pick-up of the eye image pick-up apparatus according to the embodiment. Although the display visible light source section 22 is provided behind the guide mirror 20 as seen from the authenticated person, the guide mirror 20 transmits a part of a light. Therefore, the authenticated person can see the display visible light source section 22. Since the guide mirror 20 is provided in a direction perpendicular to the optical axis of the eye image pick-up apparatus 17, an excellent eye image for the authentication can be picked up when the authenticated person stands in a position where an image 23 of his (her) eye is picked up in the center of the guide mirror 20.

According to the embodiment, thus, the guide can be easily carried out with a small-sized and inexpensive configuration in such a manner that the eye 15 of the authenticated person enters the photographing range of the image pick-up unit 21, and furthermore, the result of the authentication and the result of the focusing can be given to the authenticated person. Even if the area of the guide mirror 20 is increased, therefore, the authenticated person can be guided to a correct position. In order to further enhance precision in the guide of the position of the eye of the authenticated person, it is also possible to put a mark on the center of the front face of the guide mirror 20.

Figure 14:
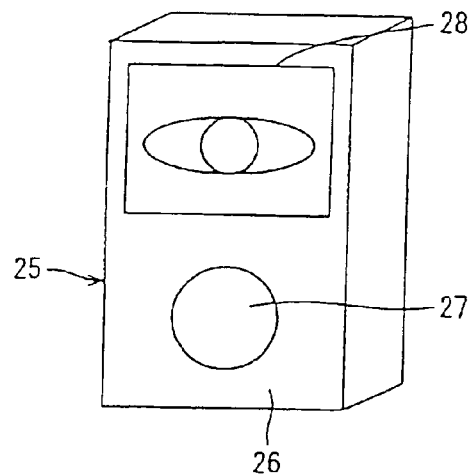
FIG. 14 is a view showing the appearance of an eye image pick-up apparatus according to a ninth embodiment of the invention.

FIG. 14 is a view showing the appearance of an eye image pick-up apparatus according to a ninth embodiment of the invention. An eye image pick-up apparatus 25 according to the embodiment has a rectangular housing 26, an infrared illuminating section 27 attached to the front face of the housing 26, a rectangular visible light cut filter (a visible light absorption filter) 28 attached to the front face of the housing 26, and an image pick-up unit 29 (see FIG. 15) attached to the back side of the visible light cut filter 28 and serving to pick up the eye image of an authenticated person who stands in front of the housing 26 through the visible light cut filter 28. The visible light cut filter 28 is configured by a plate member formed of a material which absorbs a visible light and transmits an infrared light, and reflects a part of the visible lights by a surface thereof and therefore functions as an guide mirror.

Figure 15:
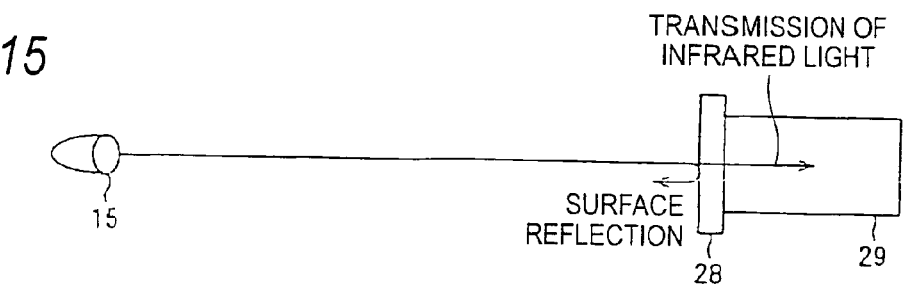
FIG. 15 is a view showing the appearance of an eye image pick-up apparatus according to a tenth embodiment of the invention.
Figure 16:
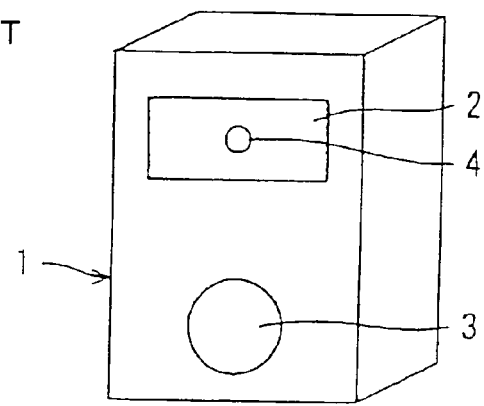
FIG. 16 is a view showing the appearance of a conventional eye image pick-up apparatus.
Figure 17A:
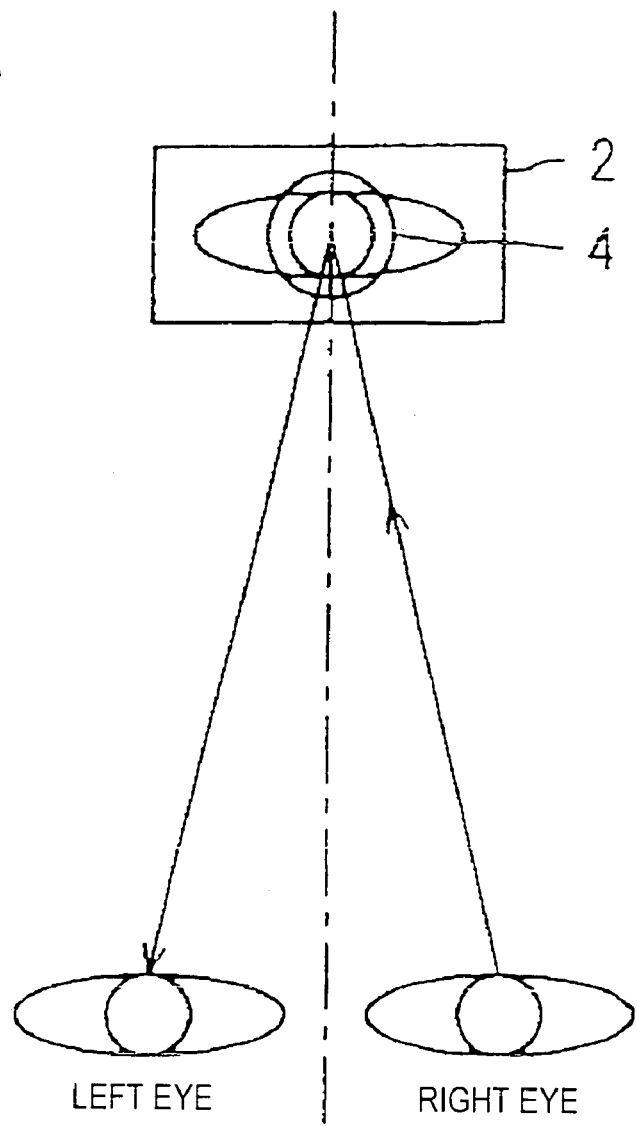
FIGS. 17A and 17B are explanatory views showing eye position guide in the conventional eye image pick-up apparatus.
Figure 17B:
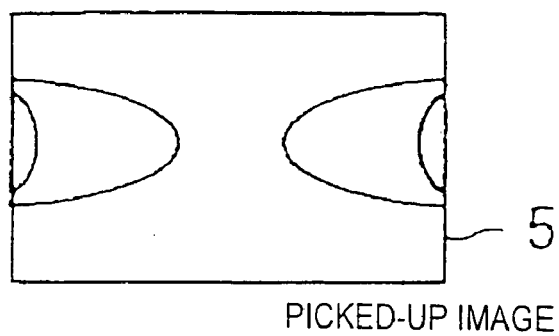

FIG. 15 is an explanatory view showing the principle of the image pick-up of the eye image pick-up apparatus according to the embodiment. The visible light cut filter 28 is provided in a direction perpendicular to the optical axis of the image pick-up unit 29. When the authenticated person changes a standing position to pick up the image of his (her) eye 15 on the visible light cut filter 28, the position of the eye 15 can be guided into the photographing range of the eye image pick-up apparatus 25. By using the visible light cut filter 28 in the eye image pick-up apparatus 25, moreover, it is possible to carry out both the guide and the visible light cut. Thus, the manufacturing cost of the apparatus can further be reduced. Also in the embodiment, it is possible to put a mark on the center of the surface of the visible light cut filter 28 in order to further enhance precision in the guide of the position of the eye of the authenticated person.

It is preferable that each of the seventh, eighth and ninth embodiments should be implemented in combination with the first to sixth embodiments. While the description has been given on the assumption that the shape of the guide mirror according to each of the embodiments is rectangular (oblong), it is a matter of course that the same shape is not restricted but any shape such as an ellipse can also function in the same manner.

While the invention has been described in detail with reference to the specific embodiments, it is apparent to the skilled in the art that various changes and modifications can be made without departing from the spirit and scope of the invention.

The application is based on Japanese Patent Application No. 2002-157869 filed on May 30, 2002, and contents thereof are cited by reference.

INDUSTRIAL APPLICABILITY

According to the invention, it is possible to provide the eye image pick-up apparatus which enables to align an eye in the photographing range of an image pick-up unit by simply causing an authenticated person to reflect his (her) eye on the center or opening of an guide mirror.

The invention claimed is:

1. An eye image pick-up apparatus comprising:
an image pick-up unit for picking up an image of an object;
a mirror, which is provided on a front face of the image pick-up unit in a direction perpendicular to an optical axis of the image pick-up unit, for reflecting a reflected image of the object;
an opening section, which is provided in a portion of the mirror which intersects the optical axis, to be aligned with a position of an eye in the reflected image of the object reflected in the mirror;
a visible light source section provided on both left and right ends at a back side of the mirror; and
a shielding plate, which is provided on both left and right ends at a front side of the mirror, for shielding a light emitted from the visible light source section corresponding to left and right.

2. The eye image pick-up apparatus according to claim 1, wherein the mirror is configured by a material which absorbs a visible light.

3. The eye image pick-up apparatus according to claim 1, wherein a mirror which has a width of d/2 and a length of h/2 is utilized as the mirror when an image pick-up unit whose photographing range in a position apart from the object is d in width and h in length is used.

4. The eye image pick-up apparatus according to claim 1, wherein a frame having a width of d/2 and a length of h/2 is provided to the mirror when an image pick-up unit whose photographing range in a position apart from the object is d in width and h in length is used.

5. The eye image pick-up apparatus according to claim 1, wherein the mirror has such a lateral length that both eyes of the object are picked up.

6. The eye image pick-up apparatus according to claim 1, wherein the mirror has a visible light absorbing characteristic.

7. The eye image pick-up apparatus according to claim 1, further comprising a section for rotating the mirror around a horizontal axis by the mirror and the image pick-up unit in a body.

8. An eye image pick-up apparatus comprising:
an image pick-up unit for picking up an image of an object;
a mirror, which is provided on a front face of the image pick-up unit in a direction perpendicular to an optical axis of the image pick-up unit, for reflecting a reflected image of the object;
an opening section, which is provided in a portion of the mirror which intersects the optical axis, to be aligned with a position of an eye in the reflected image of the object reflected in the mirror; and
a mark, which is provided on both left and right ends at a front side of the mirror, for having different colors on a surface in a direction of the object and on a back face thereof.

9. The eye image pick-up apparatus according to claim 8, wherein the mirror is configured by a material which absorbs a visible light.

10. The eye image pick-up apparatus according to claim 8, wherein a mirror which has a width of d/2 and a length of h/2 is utilized as the mirror when an image pick-up unit whose photographing range in a position apart from the object is d in width and h in length is used.

11. The eye image pick-up apparatus according to claim 8, wherein a frame having a width of d/2 and a length of h/2 is provided to the mirror when an image pick-up unit whose photographing range in a position apart from the object is d in width and h in length is used.

12. The eye image pick-up apparatus according to claim 8, wherein the mirror has such a lateral length that both eyes of the object are picked up.

13. The eye image pick-up apparatus according to claim 8, wherein the mirror has a visible light absorbing characteristic.

14. The eye image pick-up apparatus according to claim 8, further comprising a section for rotating the mirror around a horizontal axis by the mirror and the image pick-up unit in a body.

15. An eye image pick-up apparatus comprising:
an image pick-up unit for picking up an image of an object;
a half mirror, which is provided on a front face of the image pick-up unit in a direction perpendicular to an optical axis of the image pick-up unit, for reflecting a reflected image of the object;

a visible light source section provided on both left and right ends at a back side of the mirror; and a shielding plate, which is provided on both left and right ends at a front side of the mirror, for shielding a light emitted from the visible light source section corresponding to left and right.

16. An eye image pick-up apparatus comprising:

an image pick-up unit for picking up an image of an object;

a half mirror, which is provided on a front face of the image pick-up unit in a direction perpendicular to an optical axis of the image pick-up unit, for reflecting a reflected image of the object; and a mark, which is provided on both left and right ends at a front side of the mirror, for having different colors on a surface in a direction of the object and on a back face thereof.

* * * * *